US011851768B2

United States Patent
Kimura et al.

(10) Patent No.: US 11,851,768 B2
(45) Date of Patent: Dec. 26, 2023

(54) FILM-FORMING POWDER, FILM FORMING METHOD, AND FILM-FORMING POWDER PREPARING METHOD

(71) Applicant: Shin-Etsu Chemical Co., Ltd., Tokyo (JP)

(72) Inventors: Yuji Kimura, Echizen (JP); Yasushi Takai, Echizen (JP); Shigeyuki Nakamura, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/075,586

(22) Filed: Dec. 6, 2022

(65) Prior Publication Data

US 2023/0100603 A1  Mar. 30, 2023

Related U.S. Application Data

(62) Division of application No. 16/511,283, filed on Jul. 15, 2019, now Pat. No. 11,549,185.

(30) Foreign Application Priority Data

Jul. 17, 2018 (JP) .................. 2018-134243

(51) Int. Cl.
*C23C 24/02* (2006.01)
*C01F 17/259* (2020.01)
*C23C 24/08* (2006.01)

(52) U.S. Cl.
CPC ............ *C23C 24/02* (2013.01); *C01F 17/259* (2020.01); *C23C 24/08* (2013.01);
(Continued)

(58) Field of Classification Search
CPC ....... C23C 24/02; C23C 24/08; C01F 17/259; C01F 17/265
See application file for complete search history.

(56) References Cited

U.S. PATENT DOCUMENTS 9,708,187 B2 * 7/2017 Fukagawa ............... C01B 11/24
2002/0160189 A1   10/2002 Wataya et al.
(Continued)

FOREIGN PATENT DOCUMENTS

JP   2016-138309 A   8/2016
JP   2017-150083 A   8/2017
(Continued)

OTHER PUBLICATIONS

Mukherjee et al, Studies on fluorination of Y2O3 by NH4HF2, Thermochimica Acta 520, 145-152 (2011) (Year: 2011).*
(Continued)

*Primary Examiner* — Amanda C. Walke
(74) *Attorney, Agent, or Firm* — WHDA, LLP (57) ABSTRACT

A film-forming powder containing a rare earth oxyfluoride has an average particle size D50 of 0.6-15 μm, a total volume of ≤10 μm pores of 0.51-1.5 cm³/g as measured by mercury porosimetry, and a BET surface area of 3-50 m²/g is suitable for forming a dense film in high yields or deposition rates and high productivity. The film-forming powder having a greater pore volume can be prepared by forming a rare earth ammonium fluoride complex salt on surfaces of rare earth oxide particles to provide precursor particles, and heat treating the precursor particles at a temperature of 350 to 700° C.

2 Claims, 6 Drawing Sheets

(52) U.S. Cl.
CPC ...... *C01P 2004/51* (2013.01); *C01P 2004/61* (2013.01); *C01P 2004/62* (2013.01); *C01P 2006/12* (2013.01)

(56) References Cited

U.S. PATENT DOCUMENTS

| | | | |
|---|---|---|---|
| 2002/0177014 A1 | 11/2002 | Kaneyoshi et al. | |
| 2014/0057078 A1* | 2/2014 | Hamaya | C23C 4/134 |
| | | | 428/402 |
| 2014/0306145 A1 | 10/2014 | Elowe et al. | |
| 2015/0096462 A1* | 4/2015 | Fukagawa | C04B 35/62655 |
| | | | 106/14.05 |
| 2015/0111037 A1* | 4/2015 | Fukagawa | C01F 17/30 |
| | | | 428/402 |
| 2016/0244868 A1 | 8/2016 | Ibe et al. | |
| 2016/0326059 A1 | 11/2016 | Nagayama et al. | |
| 2017/0114440 A1* | 4/2017 | Takai | C23C 4/11 |
| 2017/0292182 A1* | 10/2017 | Hamaya | C23C 28/04 |
| 2017/0342539 A1 | 11/2017 | Sato et al. | |
| 2017/0370007 A1* | 12/2017 | Iguchi | C23C 24/103 |
| 2019/0241746 A1* | 8/2019 | Fukagawa | C01B 11/24 |

FOREIGN PATENT DOCUMENTS

| | | | | |
|---|---|---|---|---|
| JP | 2018053356 A | * | 4/2018 | |
| KR | 2011-0118939 A | | 11/2011 | |
| WO | WO-2014112171 A1 | * | 7/2014 | ............ C01B 11/24 |
| WO | 2018083854 A1 | | 5/2018 | |
| WO | WO-2018159713 A1 | * | 9/2018 | ............ B32B 9/005 |

OTHER PUBLICATIONS

Notice of Offer of Information by Submission of Publication dated Aug. 17, 2021, issued in counterpart JP application No. 2019-123562, with English translation. (9 pages).

Office Action dated Sep. 15, 2022, issued in counterpart CN application No. 201910642933.3, with English translation. (20 pages).

Li Fengsheng et al., "Superfine Powder Technology", National Defence Industry Press, Jul. 31, 2000, p. 277-278. (4 pages).

Notice of Allowance dated Sep. 13, 2022, issued in U.S. Appl. No. 16/511,283. (8 pages).

* cited by examiner

FILM-FORMING POWDER, FILM FORMING METHOD, AND FILM-FORMING POWDER PREPARING METHOD

CROSS-REFERENCE TO RELATED APPLICATION

This is a Divisional Application of U.S. patent application Ser. No. 16/511,283 filed Jul. 15, 2019, which is a nonprovisional application which claims priority under 35 U.S.C. § 119(a) on Patent Application No. 2018-134243 filed in Japan on Jul. 17, 2018, the entire contents of which are hereby incorporated by reference.

TECHNICAL FIELD

This invention relates to a film-forming powder suited for forming a film as a protective coating in the interior of a semiconductor manufacturing apparatus or the like, and a method for preparing the same. More particularly, this invention relates to a film-forming powder suited for forming a film by the aerosol deposition method, and a method for preparing the same. This invention also relates to a method for forming a film from the film-forming powder by aerosol deposition.

BACKGROUND ART

The interior of a semiconductor dry etching apparatus is exposed to highly reactive halogen or oxygen-based plasma. If members of non-plasma-resistant materials such as quartz glass, alumina and anodized aluminum are used as such, surface corrosion takes place to concomitantly generate particles, which cause defects to microscopic circuits on semiconductor. Therefore, the surface of a semiconductor manufacturing apparatus to be exposed to plasma is provided with a protective coating for imparting corrosion resistance against the plasma and protecting members of the apparatus.

One of such protective coatings is a coating of yttrium oxyfluoride exhibiting corrosion resistance against a wide variety of plasmas. For example, Patent Document 1 discloses that a dense, corrosion resistant protective coating made of yttrium oxyfluoride powder and having a certain range of pore volume can be formed. While Patent Document 1 describes that spraying, PVD, and aerosol deposition (AD) methods are suitable for forming the protective coating, among them, the AD method is successful in forming a protective coating having a smooth surface and causing least number of particles. Patent Document 2 describes that a coating of yttrium oxyfluoride formed by the AD method is dense as compared with a coating formed by spraying.

CITATION LIST

Patent Document 1: JP-A 2017-150083 (US 2017/0342539 A1)
Patent Document 2: KR 2011-0118939

DISCLOSURE OF INVENTION

As discussed above, a dense corrosion resistant film is obtained from aerosol deposition of conventional yttrium oxyfluoride powder. The aerosol deposition of conventional yttrium oxyfluoride powder has the drawbacks of low yields (or deposition rates) of film formation and low productivity.

An object of the invention is to provide a film-forming powder suited for forming a film by aerosol deposition, especially for forming a dense film in high yields (or deposition rates) by aerosol deposition; a method for preparing the powder; and a method for forming a film on a substrate by aerosol deposition.

Making investigations on a film-forming powder containing a rare earth oxyfluoride such as yttrium oxyfluoride, the inventors have found that when a powder having a greater pore volume is used in aerosol deposition, a dense film is formed on a substrate in high yields (or deposition rates), and that the powder having a greater pore volume is prepared by forming a rare earth ammonium fluoride complex salt on surfaces of rare earth oxide particles to provide precursor particles, and heat treating the precursor particles at a temperature of 350 to 700° C.

With this preparation method, for example, a film-forming powder containing a rare earth oxyfluoride, and having an average particle size D50 of 0.6 to 15 μm, a total volume of pores having a diameter of up to 10 μm in the range of 0.51 to 1.5 cm$^3$/g as measured by mercury porosimetry, and a specific surface area of 3 to 50 m$^2$/g as measured by the BET method is effectively prepared. Using this film-forming powder, a dense film contributing to high corrosion resistance can be formed in high yields (or deposition rates) by aerosol deposition.

In one aspect, the invention provides a film-forming powder containing a rare earth oxyfluoride, and having an average particle size D50 of 0.6 to 15 μm, a total volume of pores having a diameter of up to 10 μm in the range of 0.51 to 1.5 cm$^3$/g as measured by mercury porosimetry, and a specific surface area of 3 to 50 m$^2$/g as measured by the BET method.

Preferably, the fraction of particles having a particle size of up to 0.3 μm is up to 0.5% by volume.

Preferably, the powder has an aspect ratio of 1.2 to 3.

Preferably, the powder has a dispersity index (b80) of up to 1.6, the dispersity index (b80) being determined according to the formula (1):

$$(D90-D10)/D50 \qquad (1)$$

wherein D10, D50 and D90 are cumulative 10%, 50% and 90% diameters in volume basis particle size distribution, respectively.

Most often, the rare earth oxyfluoride is yttrium oxyfluoride.

In another aspect, the invention provides a method for forming a film, including the step of depositing the film-forming powder defined above on a substrate by the aerosol deposition method.

In a further aspect, the invention provides a method for preparing a film-forming powder containing a rare earth oxyfluoride, including the steps of forming a rare earth ammonium fluoride complex salt on surfaces of rare earth oxide particles to provide precursor particles, and heat treating the precursor particles at a temperature of 350 to 700° C.

Most often, the rare earth oxyfluoride is yttrium oxyfluoride, the rare earth oxide is yttrium oxide, and the rare earth ammonium fluoride complex salt is yttrium ammonium fluoride.

Advantageous Effects of Invention

By the preparation method of the invention, a film-forming powder having a greater pore volume can be prepared. By using the film-forming powder of the invention and applying aerosol deposition, a dense film having high corrosion resistance against halogen or oxygen-based plasma can be formed on a substrate in high yields (or deposition rates) and high productivity. The film is suitable as a protective coating in the interior of a semiconductor manufacturing apparatus.

DESCRIPTION OF PREFERRED EMBODIMENTS

One embodiment of the invention is a film-forming powder containing a rare earth oxyfluoride. The rare earth oxyfluoride is a compound consisting of a rare earth element, oxygen, and fluorine, as represented by the compositional formula: $REO_xF_{(3-2x)}$ wherein RE is a rare earth element, and x is a positive number in the range $0<x\leq 1$. Examples of the rare earth oxyfluoride include REOF (corresponding to the compositional formula wherein x=1), $RE_5O_4F_7$ (x=4/5), $RE_6O_5F_8$ (x=5/6), and $RE_7O_6F_9$ (x=6/7). The rare earth oxyfluoride in the film-forming powder may be a single compound or a mixture of two or more compounds.

Besides the rare earth oxyfluoride, the film-forming material may contain other components such as rare earth oxides (e.g., $RE_2O_3$) and rare earth fluorides (e.g., $REF_3$). Preferably the film-forming powder consists of a rare earth oxyfluoride. The presence or absence of rare earth oxyfluoride may be judged by analyzing a powder by X-ray diffractometry (XRD) to detect any rare earth oxyfluorides (such as REOF, $RE_5O_4F_7$, $RE_6O_5F_8$, and $RE_7O_6F_9$). Typically, Cu Kα ray as the specific X-ray is used in the XRD.

When the film-forming powder contains another component such as rare earth oxide (e.g., $RE_2O_3$) or rare earth fluoride (e.g., $REF_3$), the presence or absence of such oxide or fluoride may be judged by XRD. When the film-forming powder consists of a rare earth oxyfluoride, only rare earth oxyfluoride is detected on XRD. When the film-forming powder contains another component, peaks of rare earth oxide (e.g., $RE_2O_3$) or rare earth fluoride (e.g., $REF_3$) are detected. When the film-forming powder contains another component in addition to rare earth oxyfluoride, the intensity of the maximum peak of the other component (where two or more other components are contained, the total of intensities of their maximum peaks) is preferably up to 10%, more preferably up to 3% of the intensity of the maximum peak of rare earth oxyfluoride (where two or more rare earth oxyfluorides are contained, the total of intensities of their maximum peaks). The peak intensity may be evaluated by peak height. Also preferably, the film-forming powder is highly crystalline. Although it is acceptable that the powder contains a minor amount of an amorphous component, it is preferable that the powder consists of substantially crystalline compounds.

Of the components constituting the film-forming powder, the components constituting a raw material from which the film-forming powder is prepared, and the components constituting a film formed from the film-forming powder, the rare earth element (RE) is preferably one or more elements selected from yttrium and Group 3 elements from La to Lu. Of these rare earth elements, preference is given to one or more elements selected from yttrium (Y), samarium (Sm), gadolinium (Gd), dysprosium (Dy), holmium (Ho), erbium (Er), ytterbium (Yb), and lutetium (Lu). More preferably any of yttrium, samarium, gadolinium, dysprosium and ytterbium is contained as the rare earth element. Even more preferably the rare earth element consists of the majority (e.g., at least 90 mol %) of yttrium and the balance of ytterbium or lutetium. Most preferably yttrium is the sole rare earth element.

Of the components constituting the film-forming powder, and the components constituting a film formed from the film-forming powder, the inclusion of elements other than rare earth element, oxygen and fluorine is permissible as long as they are in the impurity amount. The contents of Zr, Si, Al and Fe each are preferably up to 10 ppm (weight basis).

When the rare earth element is yttrium alone, the rare earth oxyfluoride is yttrium oxyfluoride. It is a compound consisting of yttrium, oxygen, and fluorine, as represented by the compositional formula: $YO_xF_{(3-2x)}$ wherein x is a positive number in the range $0<x\leq 1$. Examples of the yttrium oxyfluoride include YOF (corresponding to the compositional formula wherein x=1), $Y_5O_4F_7$ (x=4/5), $Y_6O_5F_8$ (x=5/6), and $Y_7O_6F_9$ (x=6/7). The yttrium oxyfluoride in the film-forming powder may be a single compound or a mixture of two or more compounds. When the rare earth element is yttrium alone, the rare earth oxide is yttrium oxide (e.g., $Y_2O_3$) and the rare earth fluoride is yttrium fluoride (e.g., $YF_3$).

Another embodiment of the invention is a method for preparing the film-forming powder, the method including the steps of (1) forming a rare earth ammonium fluoride complex salt on surfaces of rare earth oxide particles to provide precursor particles, and (2) heat treating the precursor particles.

In step (1), for example, a powdery rare earth oxide (e.g., $RE_2O_3$) is dispersed in a solvent such as water or an organic solvent to form a slurry or dispersion of rare earth oxide. With stirring, ammonium fluoride (e.g., $NH_4F$ or $NH_4HF_2$) and optionally, a rare earth compound (rare earth-providing compound) other than the rare earth oxide, such as a rare earth nitrate (e.g., $RE(NO_3)_3$), rare earth chloride (e.g., $RECl_3$) or rare earth acetate (e.g., $RE(CH_3COO)_3$) are added to the dispersion. When no rare earth-providing compound is added, ammonium fluoride reacts with rare earth oxide in the surface portion of rare earth oxide particles, yielding precursor particles having a rare earth ammonium fluoride complex salt formed or precipitated on the surface of rare earth oxide (composite particles of rare earth oxide and rare earth ammonium fluoride complex salt). When the rare earth-providing compound is added, ammonium fluoride reacts with the rare earth-providing compound, or the rare earth-providing compound and rare earth oxide in the surface portion of rare earth oxide particles, yielding precursor particles having a rare earth ammonium fluoride complex salt formed or precipitated on the surface of rare earth oxide. The ammonium fluoride and the rare earth-providing compound may be added in solid form or in solution form after dissolution in a solvent such as water or organic solvent. The ammonium fluoride may also be acidic ammonium fluoride.

In step (1), a powdery rare earth oxide (i.e., rare earth oxide particles) is preferably used. In view of step (2) of causing rare earth oxide to react with rare earth ammonium fluoride complex salt, it may be contemplated to use as the starting material a substance capable of generating rare earth oxide via pyrolysis, such as rare earth carbonate or rare earth hydroxide. However, such a substance has the drawbacks that fine particles are often contained, particles are likely to be broken to generate fine particles during formation of rare earth ammonium fluoride complex salt, and particles coalesce together into large particles during subsequent heat treatment. Also, when rare earth carbonate is used, there arises the drawback that undecomposed carbon originating from the rare earth carbonate is left behind if the heat treatment temperature is below 500° C. For these reasons, it is advantageous to use powdery rare earth oxide as the starting material.

The use of powdery rare earth oxide as the starting material is also advantageous in that a powdery rare earth oxide (i.e., rare earth oxide particles) of relatively narrow or sharp particle size distribution is readily available. Also, when the film-forming powder containing rare earth oxyfluoride is prepared by the inventive method using powdery rare earth oxide as the starting material, the resulting film-forming powder has a dispersity index (b80) equal to or lower than that of powdery rare earth oxide. This means that when a powdery rare earth oxide having a narrow particle size distribution (or low dispersity index (b80)) is used, a film-forming powder having a narrower particle size distribution (or lower dispersity index (b80)) is obtained. When it is desired to obtain a film-forming powder having a dispersity index (b80) in the range defined later, for example, the powdery rare earth oxide should preferably have a dispersity index (b80) of up to 2.5, more preferably up to 2.3, even more preferably up to 2, because the particle size distribution becomes narrower as a result of conversion to the film-forming powder. The lower limit of dispersity index (b80) of the powdery rare earth oxide is typically at least 0.7

When a film-forming powder containing a rare earth oxyfluoride is prepared by the inventive method using a powdery rare earth oxide as the starting material, the resulting film-forming powder has an average particle size D50 equal to or greater than that of the powdery rare earth oxide. When it is desired to obtain a film-forming powder having an average particle size D50 in the range defined later, the powdery rare earth oxide should preferably have an average particle size D50 of at least 0.2 μm, more preferably at least 0.4 μm, even more preferably at least 0.6 μm, and up to 15 μm, more preferably up to 10 μm, even more preferably up to 8 μm, because the particle size can become greater as a result of conversion to the film-forming powder.

When a film-forming powder containing a rare earth oxyfluoride is prepared by the inventive method using a powdery rare earth oxide as the starting material, the resulting film-forming powder has an aspect ratio equal to or slightly lower than that of the powdery rare earth oxide. When it is desired to obtain a film-forming powder having an aspect ratio in the range defined later, the powdery rare earth oxide should preferably have an aspect ratio of at least 1.2, more preferably at least 1.4, even more preferably at least 1.5, most preferably at least 1.7, and up to 3.5, more preferably up to 3, even more preferably up to 2.3, because the aspect ratio can become slightly lower as a result of conversion to the film-forming powder.

The amount of ammonium fluoride added is such that a ratio (B/A) of the number of moles (B) of fluorine in ammonium fluoride to the total number of moles (A) of rare earth elements in the dispersion (only rare earth oxide when no rare earth-providing compound is added, or the sum of rare earth oxide and rare earth-providing compound when rare earth-providing compound is added) matches with the rare earth element-oxygen-fluorine composition of rare earth oxyfluoride to be created in the film-forming powder. For example, REOF is created from a setting: B/A=1, $RE_5O_4F_7$ is created from a setting: B/A=1.4, and a mixture of REOF and $RE_5O_4F_7$ is created from a setting: 1<B/A<1.4. Also, a mixture of rare earth oxide ($RE_2O_3$) and REOF is created from a setting: B/A<1, and a mixture of $RE_5O_4F_7$ and rare earth fluoride (REFS) is created from a setting: B/A>1.4. Accordingly, the ratio (B/A) may be in a range: 0.9≤B/A<1 when the product may contain a small amount of rare earth oxide ($RE_2O_3$), and in a range: 1.4<B/A≤1.6 when the product may contain a small amount of rare earth fluoride. In order to produce the film-forming powder consisting of rare earth oxyfluoride, the ratio (B/A) is preferably set in the range: 1≤B/A≤1.4.

In the embodiment when precursor particles are prepared as a dispersion, the dispersion is subjected to solid-liquid separation, typically filtration, to separate the precursor particles from the dispersion, i.e., to recover solids. If necessary, this is followed by the step of rinsing with water or an organic solvent, the step of drying at room temperature (20°) to 100° C., and/or the step of passing through a screen to loosen or disintegrate coagulated particles. The thus obtained precursor particles are ready to step (2). In step (2), the precursor particles are heat treated. The heat treatment of the precursor particles (or composite particles) causes the rare earth oxide to react with the rare earth ammonium fluoride complex salt, yielding particles containing rare earth oxyfluoride.

In the prior art method for preparing particles containing rare earth oxyfluoride, for example, by mixing and reacting rare earth oxide with rare earth fluoride as described in Patent Document 1, heat treatment at a high temperature in excess of 700° C. is necessary to promote the reaction and bring it to completion because the rare earth fluoride is not readily decomposed unless heating temperature is in excess of 700° C. The heat treatment at high temperature causes sintering between particles and densification in the interior of particles (particle shrinkage due to close contact of crystallites), resulting in particles which are densified in their interior to restrain plastic deformation at the crystallite level necessary for aerosol deposition. Therefore, the prior art method fails to produce a film-forming powder of particles which are only limitedly densified in their interior so as to allow for plastic deformation at the crystallite level necessary for aerosol deposition. In addition, since the prior art method is accompanied with an enlargement of particle size caused by sintering between particles, a pulverizing step is necessary to reduce the giant particle size back to a size suited for film formation. Since the pulverizing step generally uses a mill of stainless steel or the like and milling media of hard ceramics such as zirconia, alumina, silicon nitride and silicon carbide, typically ceramic beads, it is impossible to obtain a film-forming powder having minimized contents of Zr, Si, Al and Fe each up to 10 ppm (weight basis).

In contrast, the inventive method involves the steps of forming composite particles of rare earth oxide and rare earth ammonium fluoride complex salt and heat treating the composite particles to form particles containing rare earth oxyfluoride. The rare earth ammonium fluoride complex salt starts decomposition at about 350° C. and readily reacts with the rare earth oxide. When the precursor particles of rare earth oxide having rare earth ammonium fluoride complex salt formed on the surface thereof are heat treated, efficient reaction takes place from the state that the rare earth oxide is in close contact with the rare earth ammonium fluoride complex salt. Then rare earth oxyfluoride is created at low temperature, as compared with the prior art method. The inventive method for preparing a film-forming powder is successful in producing particles susceptible to plastic deformation at the crystallite level necessary for aerosol deposition, while restraining sintering between particles and densification of particle interior. The pulverizing step is unnecessary. The inventive method is successful in preparing a film-forming powder having a total volume of pores having a diameter of up to 10 μm of at least 0.51 cm$^3$/g, especially having an average particle size D50 of at least 0.6 μm and up to 15 μm, a total volume of pores having a diameter of up to 10 μm in the range of at least 0.51 cm$^3$/g and up to 1.5 cm$^3$/g, and a BET specific surface area of at least 3 m$^2$/g and up to 50 m$^2$/g. The contamination of impurity elements from the milling media is avoided.

In step (1), the slurry of rare earth oxide preferably has a concentration of at least 5% by weight, more preferably at least 10% by weight and up to 30% by weight, more preferably up to 25% by weight. For the reaction or aging in step (1), preferably the temperature is 10 to 80° C., and the time is 1 to 16 hours.

For the heat treatment in step (2), the temperature is preferably up to 700° C., more preferably up to 680° C., even more preferably up to 630° C. from the aspect of restraining sintering between particles and densification of particle interior. Since the rare earth ammonium fluoride complex salt undergoes decomposition at about 350° C., the heat treatment temperature may be at least 350° C., preferably at least 400° C., more preferably at least 450° C. Examples of the heat treatment atmosphere include oxygen gas-containing atmosphere, nitrogen gas-containing atmosphere, and inert gas atmospheres such as helium gas or argon gas. Since the atmosphere is for reaction to produce rare earth oxyfluoride, the oxygen gas-containing atmosphere, typically air atmosphere is preferred because carbon, nitrogen and hydrogen originating from the starting materials can be removed by oxidation, typically by firing. The reaction or firing time is preferably 1 to 10 hours.

In the film-forming powder, when the rare earth element is yttrium alone, the rare earth oxyfluoride in the powder is yttrium oxyfluoride. When such film-forming powder is prepared, the rare earth oxide and rare earth ammonium fluoride complex salt used in step (1) are preferably yttrium oxide and yttrium ammonium fluoride, respectively.

According to the invention, there is provided a film-forming powder suited for forming a film by aerosol deposition. The average particle size D50 of the film-forming powder is preferably at least 0.6 μm and up to 15 μm. The average particle size D50 is more preferably at least 0.7 μm or up to 10 μm. The average particle size D50 designates a cumulative 50% diameter (or median diameter) in a volume basis particle size distribution and is measured by the laser diffraction method, specifically the laser diffraction/scattering method. A powder having an average particle size D50 below the range contains the majority of particles with a small size. In the aerosol deposition process, when powder is injected from the nozzle toward a substrate in the vacuum chamber, turbulent flow is generated by rapid volume expansion of aerosol so that more particles of small size are scattered outside the substrate, and less particles are deposited on the substrate. On the other hand, a powder having an average particle size D50 above the range contains the majority of particles with a large size which are unamenable to aerosol deposition. That is, the proportion of particles amenable to aerosol deposition is low. There is a high probability that upon impingement against the substrate, particles of a large size are bounced back due to excessive kinetic energy, or scrape away a deposit (or film) formed on the substrate. An average particle size D50 outside the range may lead to a lowering of efficiency or yield of film formation.

Preferably the film-forming powder contains up to 0.5% by volume of particles having a particle size of up to 0.3 μm. More preferably, the film-forming powder is substantially free of particles having a particle size of up to 0.3 μm (i.e., 0% by volume). The particle size refers to a particle size in a volume basis particle size distribution and is measured by the laser diffraction method, specifically the laser diffraction/scattering method. A film-forming powder having a fraction of particles having a particle size of up to 0.3 μm above the range has the risk that particles agglomerate together in the aerosol and are difficult to disperse and suspend uniformly, leading to a lowering of efficiency or yield of film formation.

In the film-forming powder, the total volume of pores having a diameter of up to 10 μm is preferably at least 0.51 cm$^3$/g and up to 1.5 cm$^3$/g. More preferably the total volume of pores having a diameter of up to 10 μm is at least 0.55 cm$^3$/g or up to 1 cm$^3$/g. Herein, the total volume of pores having a diameter of up to 10 μm is measured by mercury porosimetry. In the measurement of pore diameter distribution by mercury porosimetry, generally a cumulative pore volume distribution relative to pore diameter is measured, from which the total volume of pores having a diameter of up to 10 μm is determined.

In the aerosol deposition, when particles injected into vacuum are impinged against the substrate, plastic deformation on the crystallite level occurs, and thus the particles deposit densely to form a film. However, particles in which the total volume of pores having a diameter of up to 10 μm is below the range have a low probability of plastic deformation owing to the dense interior of particle. There is the increased probability that particles are not deposited on the substrate as they are bounced back by the substrate upon impingement against the substrate. From the aspect of susceptible plastic deformation, as long as the total volume of pores having a diameter of up to 10 μm is at least 0.51 cm$^3$/g, a greater total volume is advantageous. However, if the total volume of pores having a diameter of up to 10 μm exceeds the range, the powder has a low (bulk) density, which means that particles are too light when the average particle size D50 is in the above-defined range. Then turbulent flow may be generated by rapid volume expansion of aerosol so that a more fraction of particles may be scattered outside the substrate, and less particles may be deposited on the substrate. A total volume of pores having a diameter of up to 10 μm outside the range may lead to a lowering of efficiency or yield of film formation.

The film-forming powder preferably has a specific surface area (as measured by the BET method) of at least 3 m$^2$/g, more preferably at least 6.5 m$^2$/g, even more preferably at least 9 m$^2$/g and up to 50 m$^2$/g, more preferably up to 40 m$^2$/g. If the BET surface area of a powder is below the range, the probability that plastic deformation occurs upon impingement of particles against the substrate is reduced owing to low surface energy, and the probability that particles are not deposited on the substrate as they are bounced back by the substrate upon impingement against the substrate is increased. In preparing a powder having a BET surface area beyond the range, heat treatment at relatively low temperature is necessary, and there is the possibility that the complex salt which has not been fully reacted is left. In addition, the powder having a BET surface area beyond the range consists of particles with a low (bulk) density which are too light within the above-defined range of average particle size D50, leaving the risk that owing to the turbulent flow generated by rapid volume expansion of aerosol, more particles may be scattered outside the substrate, and less particles may be deposited on the substrate. Either case may lead to a lowering of efficiency or yield of film formation.

The film-forming powder preferably has an aspect ratio of at least 1.2, more preferably at least 1.4, even more preferably at least 1.5, and further preferably at least 1.7, and up to 3, more preferably up to 2.3. The aspect ratio of the film-forming powder indicates a ratio of length (length along major axis) to width (width along minor axis, e.g., width perpendicular to the length direction) of a particle and may be determined, for example, by taking an electron photomicrograph of 1,000× to 10,000× magnification, measuring the width and length of discrete particles, and computing a ratio, for example, an average ratio of about 100 or more particles. If the aspect ratio of a powder is below the range, the probability that plastic deformation occurs upon impingement of particles against the substrate is reduced owing to low surface energy, and the probability that particles are not deposited on the substrate as they are bounced back by the substrate upon impingement against the substrate may be increased. If the aspect ratio of a powder is beyond the range, porosity may increase as plastic deformation occurs in a distorted fashion. An aspect ratio outside the range may lead to a lowering of efficiency or yield of film formation.

The film-forming powder preferably has a dispersity index (b80) of up to 1.6, more preferably up to 1.5. The dispersity index (b80) is determined according to the formula (1):

$$(D90-D10)/D50 \tag{1}$$

wherein D10, D50 and D90 are cumulative 10%, 50% and 90% diameters in volume basis particle size distribution, respectively, as measured by the laser diffraction method, specifically the laser diffraction/scattering method. As the dispersity index (b80) becomes greater, the particle size distribution becomes broader, and the fractions of small size particles and large size particles are accordingly increased. In aerosol deposition, small size particles and large size particles give rise to the above-mentioned problems. A film-forming powder having a dispersity index (b80) beyond the range, which has more fractions of small size particles and large size particles, may lead to a lowering of efficiency or yield of film formation. The lower limit of dispersity index (b80) of the film-forming powder is typically at least 0.7.

The method for forming a film using the film-forming powder may include spraying, physical vapor deposition (PVD), and aerosol deposition. The film-forming powder of the invention is especially effective when a film is formed on a substrate by aerosol deposition, because a film having a smooth surface and causing least number of particles can be formed. The resulting film is suited as a protective coating inside a semiconductor manufacturing apparatus or the like. Examples of the substrate include aluminum, nickel, chromium, zinc and alloys thereof, alumina, aluminum nitride, silicon nitride, silicon carbide and quartz glass, of which members of the semiconductor manufacturing apparatus are made. The film or coating thus formed preferably has a thickness of at least 2 µm, more preferably at least 5 µm, and up to 50 µm, more preferably up to 30 µm although the thickness is not particularly limited.

Figure 1:
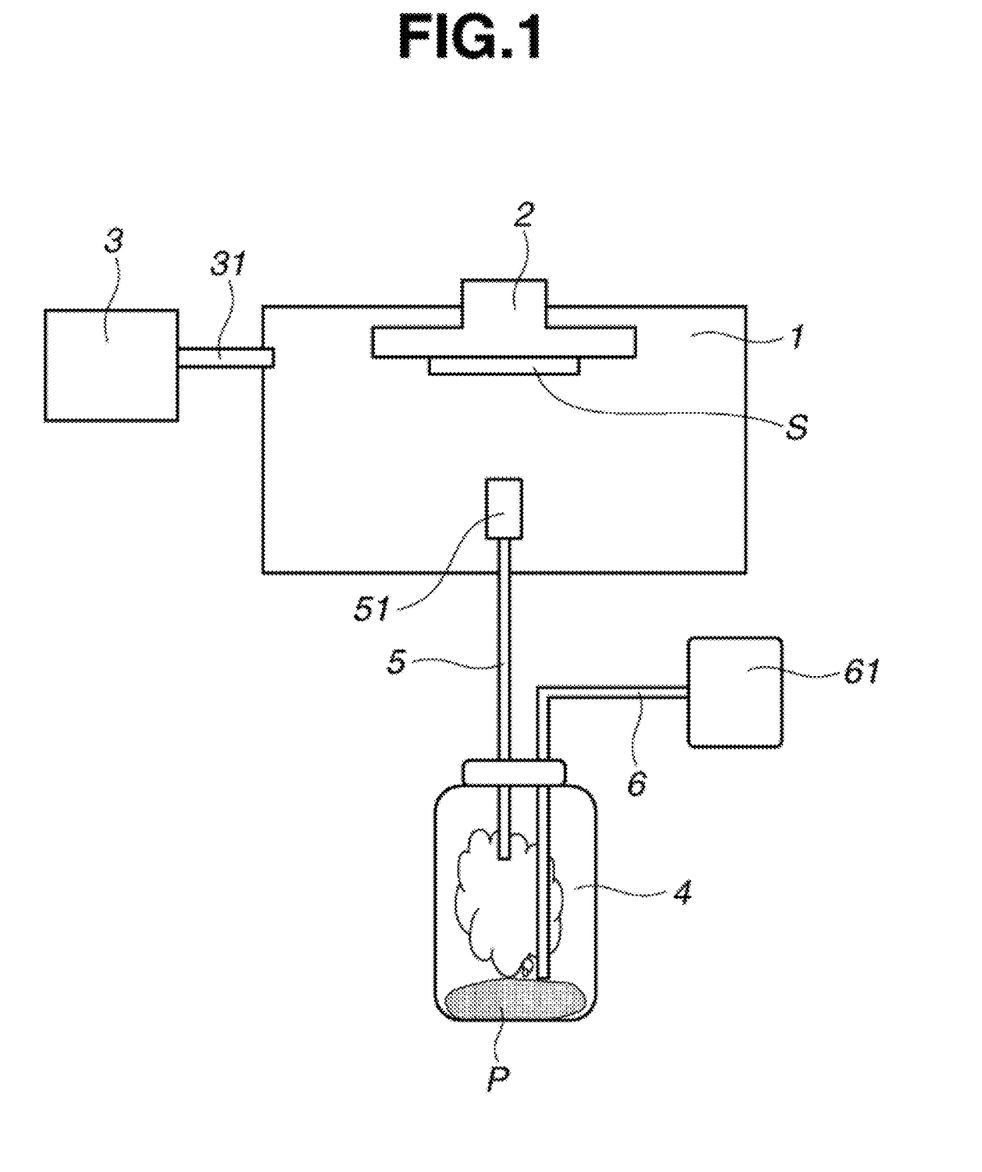
FIG. 1 schematically illustrates a system for forming a film on a substrate from a film-forming powder by the AD method.

When a film is formed by the step of depositing the film-forming powder on a substrate by the aerosol deposition method, the film-forming system and conditions may accord with well-known system and conditions. One exemplary film-forming system is illustrated in FIG. 1 as including a film-forming chamber 1 and a stage 2 which is disposed within the chamber 1 at its top such that the stage is movable in X-Y directions in a two-dimensional direction, specifically horizontal direction. A substrate S is mounted to the lower side of the stage 2. The system further includes a vacuum pump 3 in fluid communication with the chamber 1 through a conduit 31 for evacuating the chamber 1 to a reduced pressure. An aerosol generator 4 receiving a film-forming powder P is in fluid communication with the chamber 1 through a conduit 5. The conduit 5 at its distal end in the chamber 1 is provided with a nozzle 51 which is faced toward the substrate S. A carrier gas supply filled with carrier gas 61 is in fluid communication with the aerosol generator 4 through a conduit 6. A carrier gas 61 such as nitrogen gas is fed to the aerosol generator 4 to blow the film-forming powder afloat to create aerosol. The aerosol is fed through the conduit 5 and injected from the nozzle 51 toward the substrate S whereby a film or coating is deposited on the substrate S.

The film formed from the film-forming powder by aerosol deposition is a film containing the rare earth oxyfluoride like the film-forming powder. There is formed a film reflecting the construction (compounds and their ratio) of the film-forming powder, that is, a film of substantially the same constituents as the film-forming powder. When a film is formed from the inventive film-forming powder by film forming method, particularly, aerosol deposition, the resulting film is dense enough to have a porosity of up to 3% by volume, especially up to 1% by volume. The porosity can be determined by observing a cross section of the film under SEM, performing image analysis and computing pore area.

EXAMPLES

Examples of the invention are given below by way of illustration and not by way of limitation.

Yttrium oxide powder was used as the starting material and a film-forming powder was obtained therefrom. The particle size distribution (D10, average particle size D50, D90, and fraction of particles with a size of 0.3 µm or less) of the yttrium oxide powder and film-forming powder was measured by a particle size distribution measurement instrument (Microtrac MT3300 EXII by Nikkiso) relying on the laser diffraction method, specifically the laser diffraction/scattering method. A dispersity index (b80) was computed from the measurement results according to formula (1). The pore size distribution of the film-forming powder was measured by a pore size distribution measurement instrument (Auto Pore III by Micrometrics) relying on mercury porosimetry. From the cumulative pore volume distribution relative to pore diameter, the total volume (or cumulative volume) of pores with a diameter of 10 µm or less was computed. The BET specific surface area of the film-forming powder was measured by a full automatic surface area analyzer (Macsorb HM model-1280 by Mountech Co., Ltd.). The crystalline phase of the film-forming powder was analyzed by an X-ray diffraction analyzer (X-Pert Pro MPD, CuKα ray, Malvern Panalytical Ltd.) in 2θ range of 5 to 70°. The aspect ratio of the film-forming powder was determined by taking an electron photomicrograph of 1,000× to 10,000× magnification at a plurality of areas, measuring the width and length of discrete particles, and computing an average of 200 particles. The contents of impurities (Zr, Si, Al, Fe) in the film-forming powder were measured by dissolving particles in an acid and analyzing by inductively coupled plasma (ICP) emission spectroscopy.

The thickness of a film formed from the powder was measured by an eddy current coating thickness tester (LH-300 by Kett Electric Laboratory). The porosity of the film was by observing and taking images of two view fields of a cross section of the film under a SEM, and performing image analysis, and computing and averaging pore area of two view fields. In particular, the method was in conformity with ASTM E2109, the film was embedded into resin to form a sample for SEM, then reflection electron composition images (COMPO images) were taken at magnification ratio of 5,000×, and a gray value (threshold value) for binarization by density slicing operation of 256 tones gray scale image was set to the value that is one tone lower than the largest tone in dark portions corresponding to pore portions. The yield of film formation was determined by dividing the weight of a film formed on the substrate by the weight of the film-forming powder fed to the chamber of the film deposition system, that is, as percent deposition rate.

Examples 1 to 3

Yttrium oxide powder (average particle size D50=1.14 μm, dispersity index b80=1.48, manufactured by Shin-Etsu Chemical Co., Ltd.), 1.129 g (5 mol, yttrium=10 mol), was mixed with 6.5 L of water and dispersed to form a dispersion or slurry. With stirring, 370.4 g (fluorine=10 mol) of ammonium fluoride ($NH_4F$) was rapidly added to the dispersion, which was stirred and aged at 40° C. for 3 hours. In this duration, yttrium oxide reacted with ammonium fluoride, yielding precursor particles having yttrium ammonium fluoride complex salt formed or precipitated on the surface of yttrium oxide, i.e., composite particles of yttrium oxide with yttrium ammonium fluoride.

Figure 2:
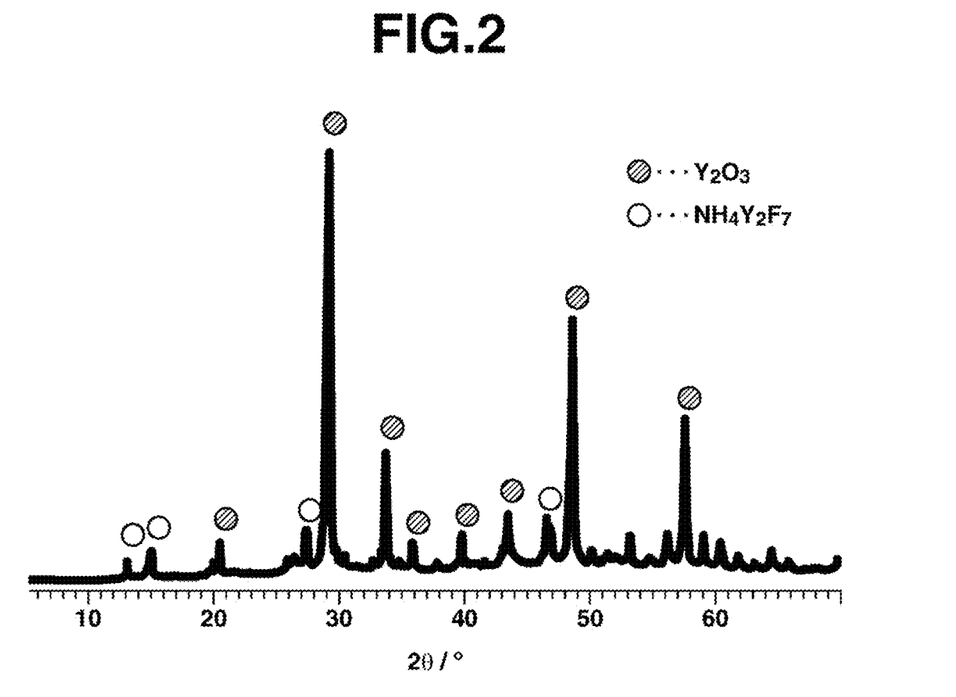
FIG. 2 is a diagram showing an X-ray diffraction profile of the powder in Example 1 after drying and before heat treatment.
Figure 3:
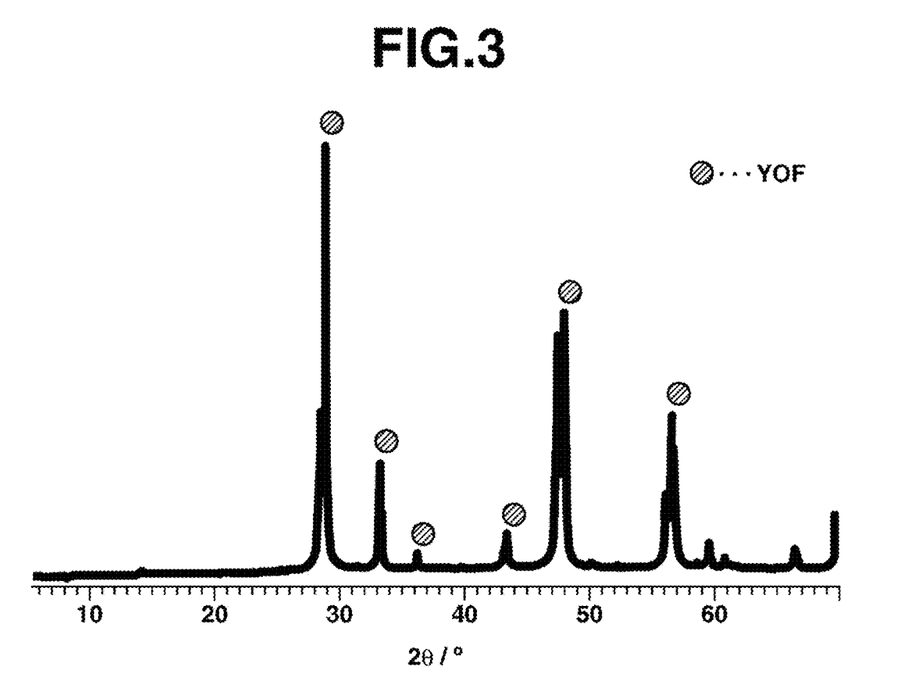
FIG. 3 is a diagram showing an X-ray diffraction profile of the powder in Example 1 after heat treatment.

Next, the dispersion was subjected to solid-liquid separation to separate the precursor particles therefrom, i.e., to recover solids. The precursor particles were rinsed with water, dried at 80° C. for 16 hours, and passed through a screen with an opening of 75 μm for loosening lightly coagulated particles. Thereafter, the precursor particles were heat treated (or fired) in an electric furnace in air atmosphere at the temperature shown in Table 1 for 3 hours, yielding a film-forming powder. FIG. 2 is an X-ray diffraction profile of the powder in Example 1 after drying and before heat treatment. FIG. 3 is an X-ray diffraction profile of the powder in Example 1 after heat treatment.

A film was formed on a substrate by using the film deposition system shown in FIG. 1, and moving the stage by reciprocating motion in a horizontal direction, while effecting aerosol deposition of the film-forming powder. The deposition conditions are shown in Table 3.

Comparative Examples 1 and 2

A film-forming powder was obtained by the same procedure as in Example 1 except that the heat treatment temperature was changed as shown in Table 1. Using the film-forming powder, a film was formed as in Example 1.

Example 4

Figure 4:
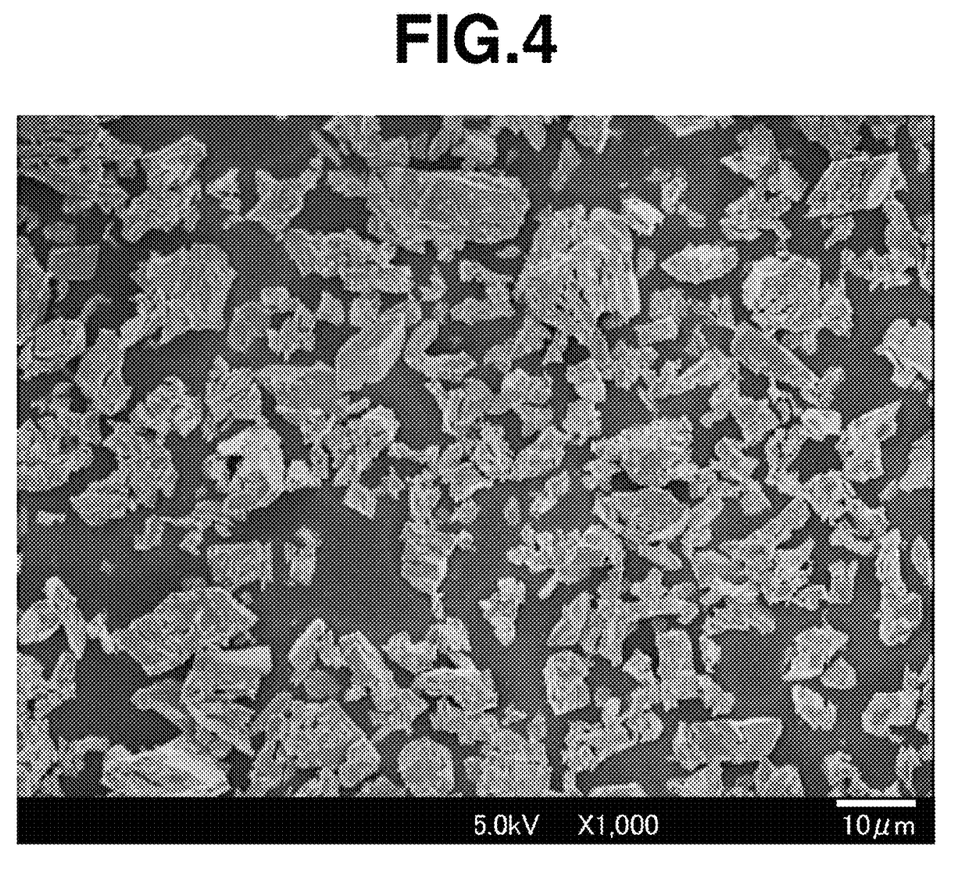
FIG. 4 is a SEM photomicrograph of yttrium oxide powder used as the starting material in Examples 4 to 6.

A film-forming powder was obtained by the same procedure as in Example 1 except that the starting material was changed to yttrium oxide powder (average particle size D50=3.92 μm, dispersity index (b80)=1.90, manufactured by Shin-Etsu Chemical Co., Ltd.) and the heat treatment temperature was changed as shown in Table 1. Using the film-forming powder, a film was formed as in Example 1. FIG. 4 is a SEM image of the yttrium oxide powder used as the starting material.

Example 5

A film-forming powder was obtained by the same procedure as in Example 1 except that the amount of ammonium fluoride ($NH_4F$) was changed to 518.5 g (14 mol). Using the film-forming powder, a film was formed as in Example 1.

Figure 5:
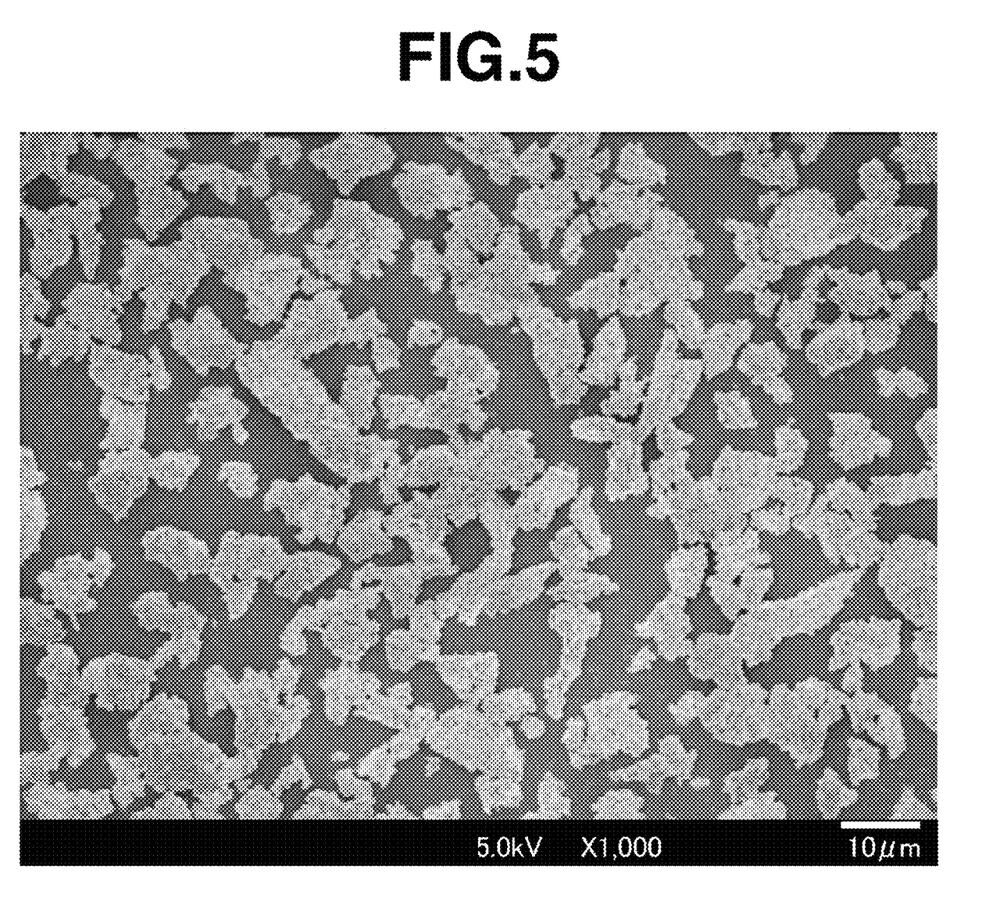
FIG. 5 is a SEM photomicrograph of the powder in Example 5 after heat treatment.
Figure 6:
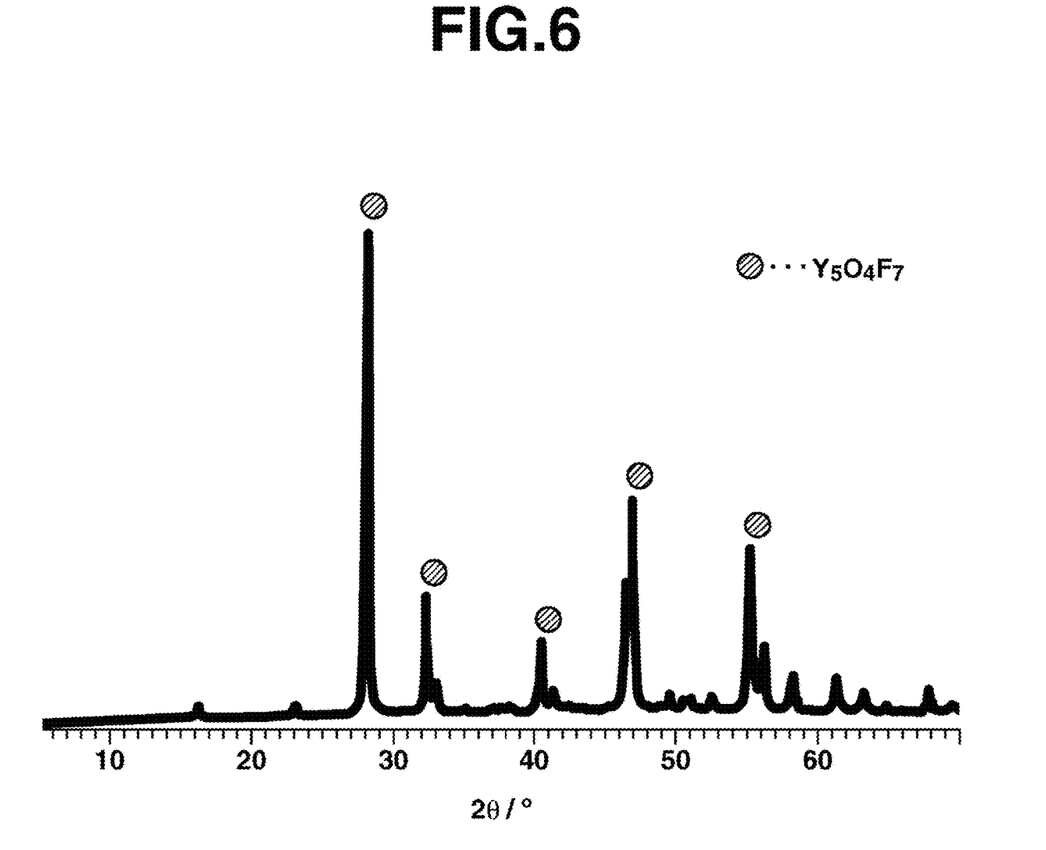
FIG. 6 is a diagram showing an X-ray diffraction profile of the powder in Example 5 after heat treatment.

FIGS. 5 and 6 are a SEM image and an X-ray diffraction profile of the powder after heat treatment, respectively.

Example 6

Yttrium oxide powder (average particle size D50=3.92 μm, dispersity index (b80)=1.90, manufactured by Shin-Etsu Chemical Co., Ltd.), 1.581 g (7 mol, yttrium=14 mol), was mixed with 10 L of water and dispersed to form a dispersion or slurry. With stirring, 10.0 L (yttrium=6 mol) of a 0.6 mol/L yttrium nitrate aqueous solution and 10.0 L (fluorine=20 mol) of a 2.0 mol/L ammonium fluoride ($NH_4F$) aqueous solution were added to the dispersion over 5 hours. In this duration, yttrium oxide and yttrium nitrate reacted with ammonium fluoride, yielding precursor particles having yttrium ammonium fluoride complex salt formed or precipitated on the surface of yttrium oxide, i.e., composite particles of yttrium oxide with yttrium ammonium fluoride.

Next, the dispersion was subjected to solid-liquid separation to separate the precursor particles therefrom, i.e., to recover solids. The precursor particles were rinsed with water, dried at 80° C. for 16 hours, and passed through a screen with an opening of 75 μm for loosening lightly coagulated particles. Thereafter, the precursor particles were heat treated (or fired) in an electric furnace in air atmosphere at the temperature shown in Table 1 for 3 hours, yielding a film-forming powder.

A film was formed on a substrate by using the film deposition system shown in FIG. 1, and moving the stage by reciprocating motion in horizontal direction, while effecting aerosol deposition of the film-forming powder. The deposition conditions are shown in Table 3.

The average particle size D50, dispersity index (b80), fraction of particles with a diameter of 0.3 μm or less, BET surface area, total volume of pores with a diameter of 10 μm or less, aspect ratio, crystalline phase, and impurity content of the film-forming powders in Examples 1 to 6 and Comparative Example 2 are tabulated as Table 1. The thickness, porosity and deposition rate of the films in Examples 1 to 6 and Comparative Example 2 are tabulated as Table 2. It is noted that, in Comparative Example 1, noticeable amounts of yttrium oxide and yttrium ammonium fluoride complex salt were left behind, no analyses were performed, but the analysis of crystalline phase by X-ray diffractometry, and no film was formed. Thus, only the crystalline phase of the film-forming powder is shown in Table 1.

TABLE 1

|  |  | Firing temp (° C.) | Yttrium oxyfluoride particles D50 (μm) | Yttrium oxyfluoride particles b80 (—) | Fraction of diameter ≤ 0.3 μm particles (vol %) | BET surface area (cm²/g) | Pore volume (cm³/g) | Aspect ratio (—) | Crystalline phase by XRD | Impurities (ppm by weight) Zr | Si | Al | Fe |
|---|---|---|---|---|---|---|---|---|---|---|---|---|---|
| Example | 1 | 450 | 1.49 | 1.19 | 0 | 34.3 | 0.615 | 1.7 | YOF single phase | <5 | <5 | <2 | <2 |
|  | 2 | 630 | 1.53 | 1.37 | 0 | 15.3 | 0.579 | 1.8 | YOF single phase | <5 | <5 | <2 | <2 |
|  | 3 | 680 | 1.56 | 1.35 | 0 | 10.5 | 0.528 | 1.7 | YOF single phase | <5 | <5 | <2 | <2 |
| Comparative Example | 1 | 300 | — | — | — | — | — | — | complex salt* + Y₂O₃ | — | — | — | — |
|  | 2 | 750 | 1.71 | 1.44 | 0 | 3.2 | 0.475 | 1.7 | YOF single phase | <5 | <5 | <2 | <2 |
| Example | 4 | 500 | 6.37 | 1.23 | 0 | 20.3 | 0.592 | 2.0 | YOF single phase | <5 | <5 | <2 | <2 |
|  | 5 | 500 | 6.78 | 1.13 | 0 | 10.5 | 0.643 | 2.3 | Y₅O₄F₇ single phase | <5 | <5 | <2 | <2 |
|  | 6 | 500 | 6.91 | 1.43 | 0 | 14.3 | 0.522 | 2.1 | YOF single phase | <5 | <5 | <2 | <2 |

*complex salt: yttrium ammonium fluoride

TABLE 2

|  | Film | | |
|---|---|---|---|
|  | Thickness (μm) | Porosity (%) | Deposition rate (wt %) |
| Example 1 | 15 | <1 | 0.28 |
| Example 2 | 13 | <1 | 0.25 |
| Example 3 | 10 | <1 | 0.19 |
| Comparative Example 1 | — | — | — |
| Comparative Example 2 | 4 | <1 | 0.07 |
| Example 4 | 15 | <1 | 0.27 |
| Example 5 | 16 | <1 | 0.30 |
| Example 6 | 8 | <1 | 0.17 |

TABLE 3

| | |
|---|---|
| Substrate | aluminum plate |
| Substrate dimensions | 30 mm × 30 mm × 3 mm thick |
| Nitrogen gas flow rate | 5 L/min |
| Pressure in chamber | 0.1 kPa |
| Nozzle opening size | 10 mm × 0.5 mm |
| Nozzle-substrate stand-off distance | 7 mm |
| Sweep speed | 1 mm/sec |
| Sweep distance | 20 mm |
| Sweep cycle | 60 cycles |

Japanese Patent Application No. 2018-134243 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a film-forming powder comprising a rare earth oxyfluoride, the method comprising the steps of:
    forming a rare earth ammonium fluoride complex salt on surfaces of rare earth oxide particles to provide precursor particles by forming a dispersion or slurry including rare earth oxide and ammonium fluoride, wherein the amount of ammonium fluoride in the dispersion or slurry is such that a ratio (B/A) of the number of moles (B) of fluorine in ammonium fluoride to the total number of moles (A) of rare earth elements in the dispersion is in the range 1≤B/A≤1.4, and
    heat treating the precursor particles at a temperature of 350 to 700° C.

2. The method of claim 1 wherein the rare earth oxyfluoride is yttrium oxyfluoride, the rare earth oxide is yttrium oxide, and the rare earth ammonium fluoride complex salt is yttrium ammonium fluoride.

* * * * *